United States Patent
Leigh et al.

(10) Patent No.: US 6,903,888 B2
(45) Date of Patent: Jun. 7, 2005

(54) DETECTION OF DEFECTS EMBEDDED IN SERVO PATTERN ON STAMPER BY USING SCATTERED LIGHT

(75) Inventors: Joseph Leigh, Campbell, CA (US); Nobuo Kurataka, Campbell, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 163 days.

(21) Appl. No.: 10/346,504

(22) Filed: Jan. 15, 2003

(65) Prior Publication Data

US 2004/0001270 A1 Jan. 1, 2004

Related U.S. Application Data

(60) Provisional application No. 60/392,788, filed on Jun. 28, 2002.

(51) Int. Cl.[7] ........................... G11B 27/36; G11B 20/18
(52) U.S. Cl. ............................. 360/31; 360/16; 360/17; 369/53.1; 369/53.2; 369/53.15; 369/53.16; 369/53.17; 356/237.1; 356/237.2; 356/237.3; 356/237.4; 356/237.5

(58) Field of Search ............................. 360/31, 53, 16, 360/17, 78.14, 77.05, 77.08; 324/210–212; 356/243.8, 243.6, 237.1–237.4; 369/53.33, 53.35, 53.15–53.17, 53.27–53.28, 53.22, 53.1–53.2

(56) References Cited

U.S. PATENT DOCUMENTS

| | | | | |
|---|---|---|---|---|
| 3,814,943 A | * | 6/1974 | Baker et al. | 250/550 |
| 5,526,341 A | * | 6/1996 | Shiba et al. | 369/275.1 |
| 5,875,027 A | * | 2/1999 | Ishiguro et al. | 356/243.4 |

* cited by examiner

Primary Examiner—Sinh Tran
Assistant Examiner—Natalia Figueroa
(74) Attorney, Agent, or Firm—Raghunath S. Minisandram; Jesus Del Castillo

(57) ABSTRACT

Defects of a hard disk drive servo pattern stamper are detected by comparing a scattered light beam pattern against the known servo pattern. A magnetic field is applied to stamper and the beam is linearly polarized. Variations in the physical offset of the beam, its scatter, are indicative of physical defects. Variations in the Kerr rotation of scattered beam are indicative of magnetic defects.

18 Claims, 4 Drawing Sheets

DETECTION OF DEFECTS EMBEDDED IN SERVO PATTERN ON STAMPER BY USING SCATTERED LIGHT

CROSS-REFERENCE TO RELATED APPLICATIONS

This application claims benefit of U.S. provisional patent application Ser. No. 60/392,788, filed on Jun. 28, 2002, which is hereby incorporated by reference.

BACKGROUND OF THE INVENTION

1. Field of the Invention

The invention relates to field of disk drives and more particularly to methods for writing servo tracks on magnetic hard disks.

2. Description of Related Art

Hard disk drives provide prerecorded tracking servo information on the data recording surfaces of their magnetic hard disks. This servo information typically comprises servo bursts spaced evenly along tracks. Data is recorded between the servo bursts. In most cases, servo bursts are approximately radially aligned, describing a small arc from the disk's ID to its OD. This radial alignment makes them look like arced spokes of the wheel. They are made to form and arc because the servo data is read by a rotary actuator that describes the same arc because the traverses between a disk's ID and its OD.

FIG. 1 illustrates a disk 10 having a number of servo data spokes 12. While there are eight illustrated in the figure, a typical disk drive disk will typically have hundreds of such servo data spokes spaced it even angles around disk. The number of such servo data spokes depends upon the track density. As a general rule, the greater the number of spokes, the higher the track density that can be employed in the disk drive. In many disk drives today, the servo data takes up approximately 11 percent of the total disk drive recording surface.

The servo bursts may be written onto a disk's surface using a variety of techniques. The most common method is to write the servo onto the disk using the disk drive's own magnetic head controlled typically by an externally introduced picker that grasps the drive's rotary actuator arm upon which the read/write head is mounted. An external mechanism incrementally moves the arm while other circuits command the disk drive to write the servo bursts.

Another common servo-writing method comprises writing servo bursts onto the disks already assembled onto the disk drive spindle but prior to the disk drive spindle/disk combination, also known as a hub/disk assembly ("HDA"), being assembled into the disk drive itself.

A newer approach employs a stamper to "print" the servo patterns on the disk using a high permeability stamper, as illustrated in FIG. 2, to impose a pattern on media. As illustrated in the top leftmost portion of the figure, the disk is first DC erased. For example, an externally applied field, the large arrows H in the figure, causes all the magnetic domains 14 of the media to switch in an uniform direction as illustrated. Next, a high permeability stamper 16, having a desired pattern 17, is pressed against the disk 10. An externally applied field of opposite polarity, illustrated by the now downward arrows, is now applied to the disk through the stamper 16. This causes the disk areas in contact with the stamper 16 to switch their magnetic direction to be aligned with the externally applied field. The areas not in contact with the stamper are shielded by the stamper. The shielded areas do not changed their magnetic orientation. This causes the disk to assume a reversed magnetic orientation 15 in the pattern 17 of the stamper 16.

While FIG. 2 illustrates vertically oriented magnetic domains 14 and 15 which are useful in perpendicular recording, the same technique may be employed using horizontally oriented magnetic fields to encode horizontally oriented magnetic domains.

The stamper 16 appears identical to FIG. 1 when viewed from a plan view. In other words, the stamper 16 would encode the images of the servo bursts radially aligned in arced spokes as illustrated in FIG. 1.

A problem that occurs in writing servo onto a disk regardless of the technique used is that the disk drives can tolerate only so much servo error before servo must be rewritten or the disk scrapped. Most drives cannot, for example, tolerate two bad servo bursts in a row.

Today's disk drive manufacturing processed, therefore, typically check the quality stampers servo data patterns before the stamper is used to print servo data onto a disk.

There are three conventional methods for inspecting stampers for servo defects:

1. manual visual inspection;
2. atomic force microscopy ("AFM"); and
3. optical microscopy.

The problem with the first method is that it is to manually labor-intensive. The problem with us the last two methods are that they are too time-consuming. Better and faster methods to test stampers are needed.

SUMMARY OF THE INVENTION

The invention comprises detecting defects embedded in servo patterns on a magnetic hard disk servo pattern stamper using scattered light. The defects may be physical defects, magnetic defects or both. A beam is scanned across a servo pattern on a stamper. The scattered beam is detected and then compared to the servo pattern to identify defects. Physical defects cause offsets in the scattered beam. Magnetic defects cause unexpected Kerr rotation.

DETAILED DESCRIPTION OF THE PREFERRED EMBODIMENTS

Figure 1:
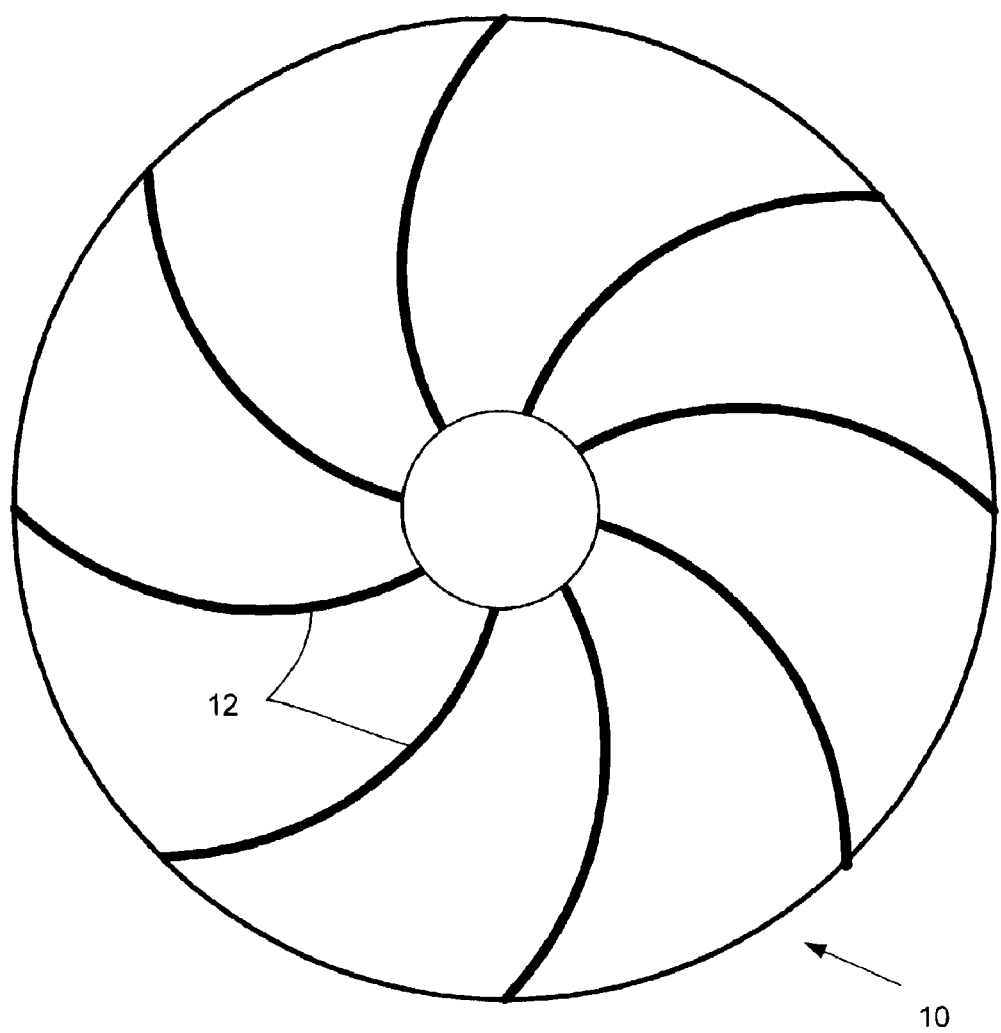
FIG. 1 is an illustration of the arced spoke patterns of servo data on a magnetic hard disk.
Figure 2:
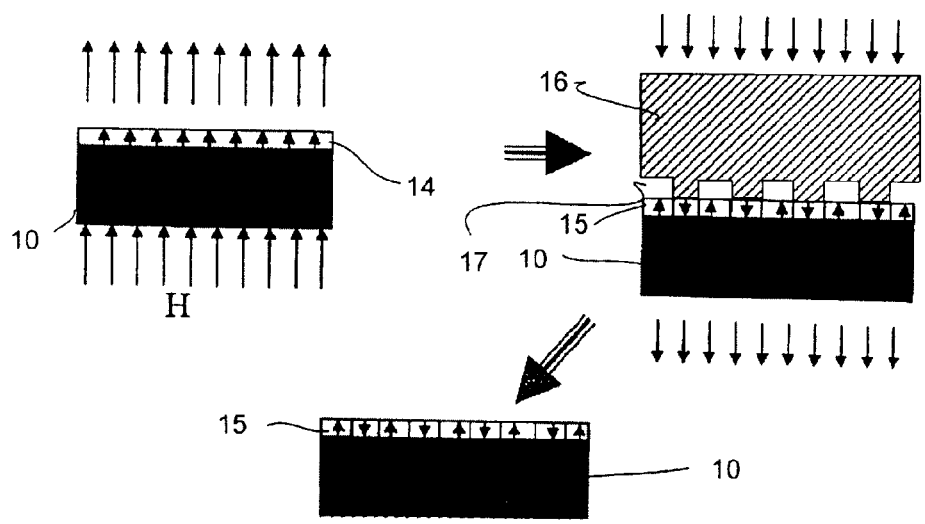
FIG. 2. illustrates a method for recording magnetic marks onto the disk using a high permeability stamper.
Figure 3:
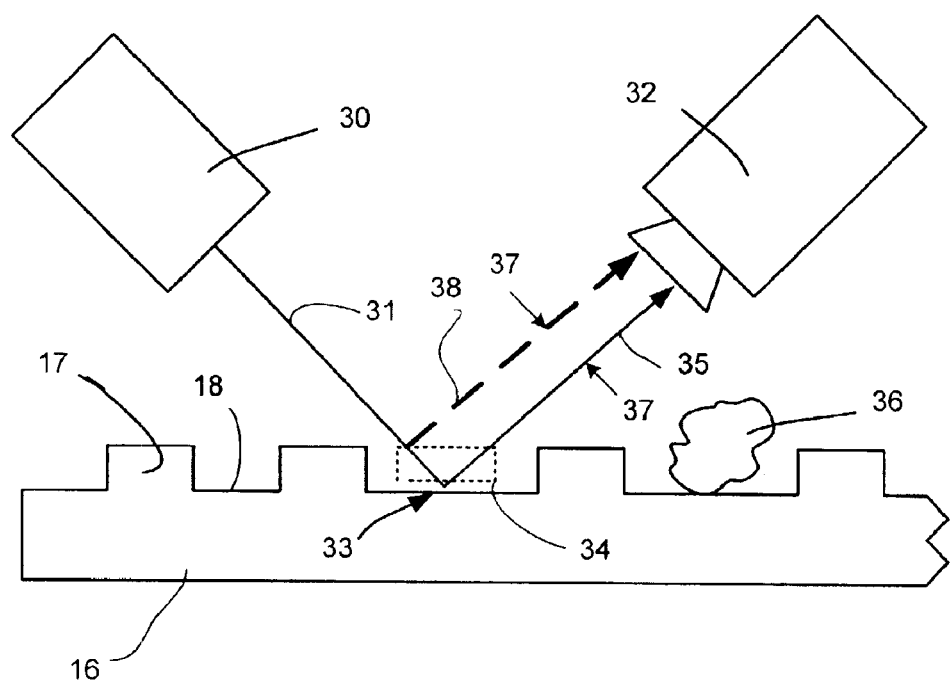
FIG. 3 illustrate the detection of physical stamper defects using scattered light.

FIG. 3 illustrates an apparatus for detecting physical defects on a hard disk servo pattern stamper. In the Fig., stamper 16 has embossed on at least one surface thereof a servo pattern consisting of raised surfaces 17. The servo pattern may have physical defects. A first kind of physical defect is a dropout 34. A dropout consists of a missing embossed pattern, i.e., an empty space appears where the servo pattern would call for stamper to have an embossed raised feature. This is illustrated by the dotted line 34 in the figure indicating the absence of embossed feature. This is a dropout.

The second kind of physical defect is debris 36. Debris 36 may be lodged onto the stamper 16 in area of the servo pattern 17. Debris not only causes the false recording of a servo "pattern" on the magnetic hard disk, the debris may cause physical damage to the disk.

Referring again to FIG. 3, a light source 30 emits a beam of light 31 which reflected by the stamper at point 33, for example, to a reflected beam 35, which is then turned detected by light detector 32, which may also conduct the comparison of the received pattern to the expected pattern, or may pass the data onto a computer (not shown) for this purpose. The beam may be of any kind of light of sufficiently small wavelength so that it does not have a significant amount of diffractive interference with the servo pattern. The light source is preferably a laser.

The angle of reflection of the reflected beam 35 is equal to the angle of incidence of the incident beam 31. Thus the reflected beam will have offset 37 at the detector 32 depending and whether the beam strikes the surface 18 of the stamper or one of the embossed features 17 of the servo pattern. The dashed line 38 indicates the path of the reflected beam had it struck an embossed feature 34, which is also drawn as a dotted line to indicate a dropout.

The offset 37 may also occur when the beam 30 strikes debris 36 instead of the stamper surface 18 or embossed features 17.

In order to detect physical defects in the servo pattern, the beam must be scanned across the servo pattern on the stamper while the optical detector 32 detects the reflected beam, which can either be the beam 35 reflected from the surface 18 of the stamper or the beam 38 reflected from an embossed feature 17 of the stamper (or debris). By comparing the scanned beam against a known servo pattern, the differences between patterns will be indicative of the presence of physical defects in the pattern. The locations of these defects can then be mapped for subsequent verification by the use of AFM or optical microscopy, for example.

A scan may comprise any of the following: rotating a stamper on a spinstand (optional) under the optical detector (30, 32) in combination with indexing the detector radially, using an X-Y positioner (not shown), scanning the beam 30 itself, or any combination of these. If the beam itself is scanned, the angle of incidence will correspondingly change. This must be compensated for in the detection algorithm.

FIG. 3 illustrates a beam size much smaller than the size of servo patterns being observed. If, however, the beam size (spot size) is much larger, for example, larger even then the size of the servo patterns being detected, the physical offsets in the reflected beam may be detected by the optical detector 32 in the form of amplitude variations. The amplitude variations may be so small that individual servo patterns 17, 18 or defects 34 or 36 cannot be detected. Under these circumstances, defects in the servo patterns may be detected by using pattern recognition techniques. For example, the a known good stamper servo pattern may be scanned one or more times to form a reference pattern of the amplitude density of the detected beam. The pattern detected from a scan of a stamper under test may then be compared to this reference pattern. Statistically significant variations between the two patterns indicate the presence of defects.

A preferred statistical technique for detecting these differences is to use a statistical measurement known as Kurtosis. Kurtosis is a measure of peakedness of an amplitude density curve. This measurement is highly sensitive to peaks and valleys because it employs the fourth power of deviations from a mean or baseline signal. The statistical formula for Kurtosis is $$R_{ku} = \frac{1}{R_q^4} \frac{1}{N} \sum_{j=1}^{N} Z_j^4 \text{ where } R_q = RMS = \sqrt{\frac{1}{N} \sum_{j=1}^{N} Z_j^2}, \text{ and}$$

Z is the distance from a baseline signal for a sample j.

For example, if a beam spot size is on the order of six microns and it is used to scan a servo burst or spoke 50 microns in length, the scanning system may take samples at 5 micron increments. The entire spoke may be scanned with only nine samples. Each of these samples would have an amplitude distance Z from an amplitude baseline signal. The Kurtosis value for the servo burst or spoke could be calculated and then compared to a reference Kurtosis value computed from signal generated by a known good servo pattern. If the deviation, for example, exceeded a predetermined value indicative of the presence or absence of a defect, the particular bad servo burst or spoke may be flagged for later inspection by more sensitive equipment such as atomic force microscopes.

Alternatively, the Kurtosis value may be calculated for every servo burst or spoke on a track. If the deviation, for example, exceeded a predetermined value indicative of the presence or absence of a defect somewhere on a track, the particular bad track may be flagged for later inspection by more sensitive equipment.

Figure 4:
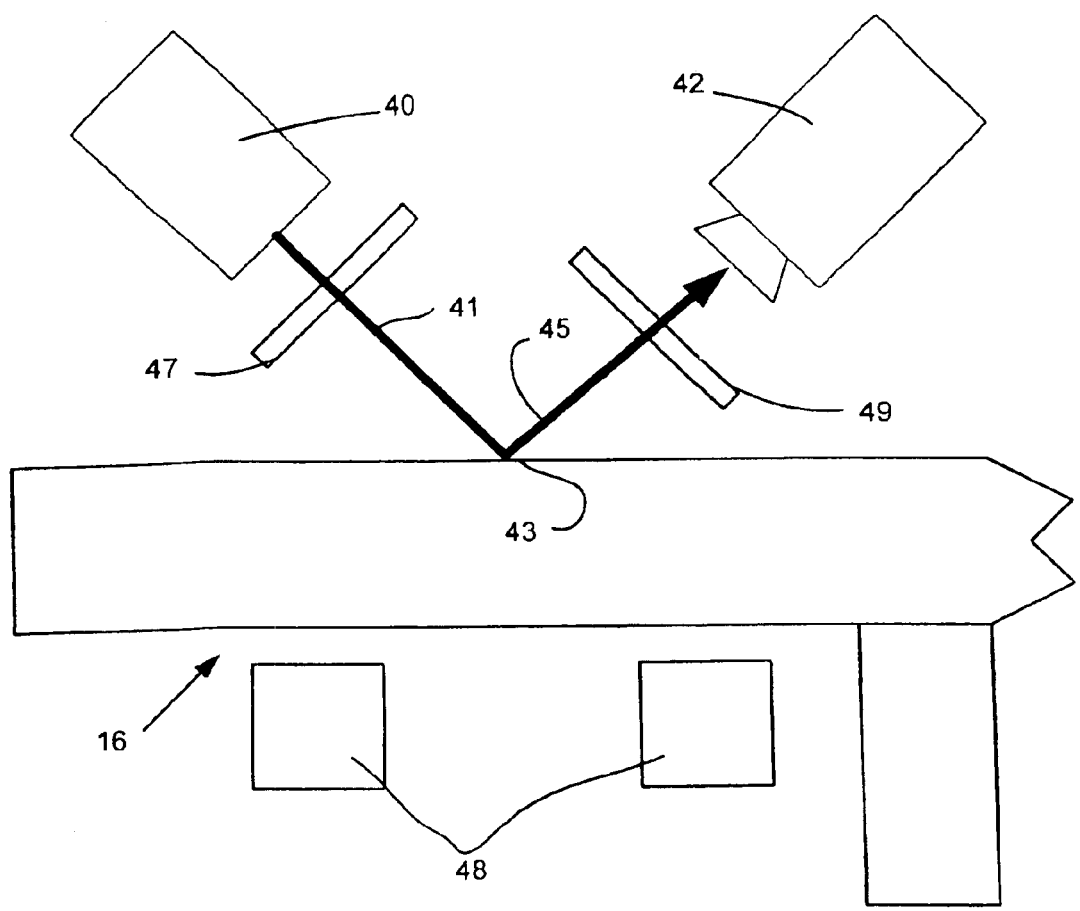
FIG. 4 illustrates the detection of magnetic stamper defects using scattered light and Kerr rotation.

Referring to FIG. 4, magnetic defects in the stamper may be detected by the use of Kerr rotation. Magnetic defects comprise areas of the stamper having reduced or no permeability such that that even if the stamper does not have a physical defect, it still would not print the desired servo pattern because of its failure to conduct enough of the external magnetic field to the magnetic hard disk. Alternatively, the small particles can adhere to the servo pattern. If the particles are non magnetic, they will reduced the effective permeability at the location of the particle. If they are magnetic, they will cause increased magnetization at the location of the particle. In either case, they may be detected through Kerr rotation.

In the figure, a source of magnetic field such as electromagnetic 48 applies a magnetic field to the stamper 16 from one side thereof. A Kerr rotation optical detector (40, 42, 47 and 49) is mounted facing the other side of the stamper 16. The Kerr rotation optical scanner consists of a light source 40, preferably a laser beam 41. This beam passes through a polarizer 47, which preferably may be a linear polarizer. This beam 41 strikes the stamper at a point 43 where it is reflected through a polarization analyzer 49 and is then detected by and optical detector 42. When the beam strikes the surface of the stamper 16, it's polarization is rotated slightly by a phenomenon known as Kerr rotation. The polarizing analyzer 49 transmits the beam 45 depending upon it's polarization. Thus the level of transmission will depend upon the polarization of the reflected beam 45. This difference in beam intensity may be detected by the optical detector 42, which may also conduct the comparison of the received pattern with the expected pattern, or pass the data onto a computer (not shown) for this purpose.

As discussed above the connection with FIG. 3, the magnetic defects in the servo pattern may be determined by scanning the beam across the servo patterns, detecting reflected beam intensity and comparing it is to the pattern expected. The differences between the intensity of the reflected beam and the expected intensity are caused by magnetic defects. In particular, a statistical representation of a the Kerr rotation signals measured from a good pattern may be formed into a reference pattern. A preferred statistical representation is the Kurtosis of at least one servo spoke on a track. Alternatively, the statistical representation may be the Kurtosis of all servo spokes on a track.

As before, the scan may be affected by rotating the stamper and radially indexing the optical detector, by moving stamper on and X-Y positioner, by scanning the beam itself, or by any combination of these.

While either of the aforementioned techniques may be used independently of each other, they are preferably combined. Thus the detector is preferably adapted to detect both offsets in the reflected beam indicative of physical defects and also is adapted to detect variations in the Kerr rotation of the reflected beam. The apparatus for doing so will look very much like the apparatus depicted in FIG. 4. The optical detector 40 would also be additionally sensitive to the beam offsets 37 from FIG. 3. With a combined apparatus, a single scan of the stamper will detect both physical and magnetic defects.

The description of the preferred apparatus may be varied by those ordinary skill as appropriate and should not be taken as a limitation on the scope of the pending claims.

We claim:

1. A method of detecting defects in a magnetic hard disk servo pattern stamper, comprising:
   scanning a servo pattern on a stamper with an incident beam;
   detecting a reflected beam from the stamper to form a detected pattern signal, the reflected beam scattered according to the pattern on the stamper; and
   comparing the detected pattern against a reference servo pattern signal to identify defects.

2. The method according to claim 1 wherein a physical offset of scattered beam depends on the presence or absence of a servo pattern or debris.

3. A method of detecting defects in a magnetic hard disk servo pattern stamper, comprising:
   scanning a servo pattern on a stamper with an incident beam;
   detecting a reflected beam from the stamper to form a detected pattern signal, the reflected beam scattered according to the pattern on the stamper, wherein said detecting further comprises:
   applying a magnetic field to the stamper;
   detecting a Kerr rotation of the reflected scattered beam to form a Kerr rotation signal; the Kerr rotation signal having a pattern; and
   comparing the detected pattern against a reference servo pattern signal to identify defects by comparing the Kerr rotation signal pattern against a reference Kerr rotation servo pattern signal to identify magnetic defects.

4. A method of detecting defects in a magnetic hard disk servo pattern stamper, comprising:
   scanning a servo pattern on a stamper with an incident beam;
   detecting a reflected beam from the stamper to form a detected pattern signal, the reflected beam scattered according to the pattern on the stamper, wherein said detecting further comprises:
   applying a magnetic field to the stamper;
   detecting a Kerr rotation of the reflected scattered beam to form a Kerr rotation signal; the Kerr rotation signal having a pattern;
   comparing the detected pattern against a reference servo pattern signal to identify defects by comparing the Kerr rotation signal pattern against a reference Kerr rotation servo pattern signal to identify magnetic defects; and
   wherein a physical offset of scattered beam depends on the presence or absence of a servo pattern or debris.

5. The method according to claim 3 wherein the incident beam is linearly polarized light.

6. The method according to claim 3 wherein the magnetic field is applied by an electromagnet.

7. A method of detecting defects in a magnetic hard disk servo pattern stamper, comprising:
   scanning a servo pattern on a stamper with an incident beam;
   detecting a reflected beam from the stamper to form a detected pattern signal, the reflected beam scattered according to the pattern on the stamper;
   comparing the detected pattern against a reference servo pattern signal to identify defects; and
   wherein the reference servo pattern signal is determined by
   scanning a known good stamper servo pattern with an incident beam to form a reflected beam scattered by the stamper servo pattern;
   detecting the amplitude of the reflected beam to form an detected amplitude signal; and
   forming a reference servo pattern signal comprising a statistical representation of the detected amplitude signal.

8. The method according to claim 7 wherein the statistical representation is a Kurtosis value calculated from the amplitude signal detected from at least one servo spoke.

9. The method according to claim 7 wherein the statistical representation is a Kurtosis value calculated from the amplitude signal detected from substantially all servo spokes on a track.

10. Apparatus for detecting defects in a magnetic hard disk servo pattern stamper, comprising:
    means for scanning a servo pattern on a stamper with an incident beam;
    means for detecting a reflected beam from the stamper to form a detected pattern, the reflected beam scattered according to the pattern on the stamper; and
    means for comparing the detected pattern against a reference servo pattern to identify defects.

11. Apparatus according to claim 10 wherein a physical offset of scattered beam depends on the presence or absence of a servo pattern or debris.

12. Apparatus for detecting defects in a magnetic hard disk servo pattern stamper, comprising:
    means for scanning a servo pattern on a stamper with an incident beam;
    means for detecting a reflected beam from the stamper to form a detected pattern, the reflected beam scattered according to the pattern on the stamper, wherein said detecting further comprises:
    means for applying a magnetic field to the stamper;
    means for detecting a Kerr rotation of the reflected scattered beam to form a Kerr rotation signal; the Kerr rotation signal having a pattern; and
    means for comparing the detected pattern against a reference servo pattern to identify defects comprising a means for comparing the Kerr rotation signal pattern against a reference Kerr rotation servo pattern signal to identify magnetic defects.

13. Apparatus for detecting defects in a magnetic hard disk servo pattern stamper, comprising:
    means for scanning a servo pattern on a stamper with an incident beam;

means for detecting a reflected beam from the stamper to form a detected pattern, the reflected beam scattered according to the pattern on the stamper, wherein said detecting further comprises:

means for applying a magnetic field to the stamper;

means for detecting a Kerr rotation of the reflected scattered beam to form a Kerr rotation signal; the Kerr rotation signal having a pattern;

means for comparing the detected pattern against a reference servo pattern to identify defects comprising a means for comparing the Kerr rotation signal pattern against a reference Kerr rotation servo pattern signal to identify magnetic defeats; and wherein a physical offset of scattered beam depends on the presence or absence of a servo pattern or debris.

14. Apparatus according to claim 12 wherein the incident beam is linearly polarized light.

15. Apparatus according to claim 12 wherein the magnetic field is applied by an electromagnetic means.

16. Apparatus for detecting defects in a magnetic hard disk servo pattern stamper, comprising:

means for scanning a servo pattern on a stamper with an incident beam;

means for detecting a reflected beam from the stamper to form a detected pattern, the reflected beam scattered according to the pattern on the stamper;

means for comparing the detected pattern against a reference servo pattern to identify defects; and wherein the reference servo pattern signal is determined by means for scanning a known good stamper servo pattern with an incident beam to form a reflected beam scattered by the stamper servo pattern;

means for detecting the amplitude of the reflected beam to form an detected amplitude signal; and means for forming a reference servo pattern signal comprising a statistical representation of the detected amplitude signal.

17. Apparatus according to claim 16 wherein the statistical representation is a Kurtosis value calculated from the amplitude signal detected from at least one servo spoke.

18. Apparatus according to claim 16 wherein the statistical representation is a Kurtosis value calculated from the amplitude signal detected from substantially all servo spokes on a track.

* * * * *